United States Patent
Xiong et al.

(10) Patent No.: US 6,671,256 B1
(45) Date of Patent: Dec. 30, 2003

(54) DATA CHANNEL RESERVATION IN OPTICAL BURST-SWITCHED NETWORKS

(75) Inventors: Yijun Xiong, Plano, TX (US); Anshul Agrawal, Plano, TX (US); Marc L. J. Vandenhoute, Dallas, TX (US); Hakki C. Cankaya, Dallas, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/497,254

(22) Filed: Feb. 3, 2000

(51) Int. Cl.$^7$ .............................................. H04Q 11/04
(52) U.S. Cl. ..................... 370/230; 370/437; 398/51; 398/54
(58) Field of Search .................. 370/254, 351, 370/400, 410, 431, 433, 445, 464, 230, 437; 385/15, 16, 24; 398/34, 51, 54, 19

(56) References Cited

U.S. PATENT DOCUMENTS

| | | | |
|---|---|---|---|
| 5,416,769 A | 5/1995 | Karol ........................... | 370/60 |
| 5,469,284 A | 11/1995 | Haas ........................... | 359/139 |
| 5,486,943 A | 1/1996 | Sasayama et al. .......... | 359/123 |
| 5,734,486 A | 3/1998 | Guillemot et al. .......... | 359/139 |
| 5,737,106 A | 4/1998 | Sansonetti et al. .......... | 359/140 |
| 5,764,392 A * | 6/1998 | Van As et al. ................ | 398/79 |
| 5,781,537 A | 7/1998 | Ramaswami et al. ....... | 370/254 |
| 2002/0054732 A1 * | 5/2002 | Zheng .......................... | 385/24 |

OTHER PUBLICATIONS

Turner, "WDM Burst Switching". INET 1999. Jun. 1999. Pp. 1–11.*

Arakawa et al. "Delay Analyses of Wavelength Reservation Methods for High–Speed Burst TRansfer in Photonic Networks". IEEE Communications. Oct. 18, 1999–Oct. 22, 1999. Pp. 445–449.*

Yuan et al. Distributed Path Reservation Algorithms for Multiplexed All–optical Interconnection Networks'. IEEE Computers. Dec. 1999. Pp. 1355–1363.*

Chen et al. "WDM Burst Switching for Petabit Capacity Routers". IEEE MILCOM. Oct. 31, 1999–Nov. 3, 1999. Pp. 968–973.*

Callegati et al. "Design Issues of Optical IP Routers for Internet Backbone Applications". IEEE Communications Magazine. Dec. 1999. Pp. 124–128.*

Australian Patent Office Search Report dated Oct. 19, 2001.

*A Flexible Cross–Connect Network Using Multiple Optical Carriers*, by G. Depovere, et al. of Philips Research Laboratories, The Netherlands and N. Wauters, et al. of IMEC–LEA, University of Gent, Belgium (4 pgs.).

* cited by examiner

*Primary Examiner*—Melvin Marcelo
*Assistant Examiner*—Derrick W Ferris
(74) *Attorney, Agent, or Firm*—Gary Cary Ware & Freidenrich, LLP; Jessica W. Smith; V. Lawrence Sewell (57) ABSTRACT

The present invention provides a system and method for reserving data channels in an optical burst-switched network. A data channel (or a multiple of data channels) along an optical path in an optical burst-switched network is reserved by first transmitting a data channel reservation request from an electronic ingress edge router to a reservation termination node. Next, the data channel reservation request is processed at all nodes along the optical path, including the reservation termination node. A data channel reservation acknowledgement is then transmitted from the reservation termination node to the electronic ingress edge router. Finally, the data channel path is reserved once an initial burst(s) which contains a reserve data channel bit reaches the reservation termination node.

16 Claims, 4 Drawing Sheets

| DCG_in | CHANNEL_in | CHANNEL_out | STATUS |
|--------|------------|-------------|--------|
| $G_p$  | $\lambda_u$ | $\lambda_v$ | 1 |
| $G_q$  | $\lambda_n$ | -           | 0 |
|        |            |             |   |

FIG. 9 900

| DCG_in | CHANNEL_in | CHANNEL_out | STATUS |
|--------|------------|-------------|--------|
| $G_r$  | $\lambda_x$ | $\lambda_y$ | 1 |
| $G_s$  | $\lambda_z$ | $\lambda_f$ | 0 |
|        |            |             |   |

FIG. 10

DATA CHANNEL RESERVATION IN OPTICAL BURST-SWITCHED NETWORKS

TECHNICAL FIELD OF THE INVENTION

The present invention relates generally to optical network systems, and more particularly to a system and method for providing data channel reservation in an optical burst-switched network.

BACKGROUND OF THE INVENTION

Data traffic over networks, particularly the internet, has increased dramatically over the past several years, and this trend will continue with the introduction of new services which require more bandwidth. The enlarged volume of internet traffic requires a network with high capacity routers capable of routing data packets with variable lengths. One option is the use of optical networks. However, current optical networks use only a small fraction of the bandwidth available on a single optical fiber.

The emergence of dense-wavelength division multiplexing (DWDM) technology has helped to overcome the bandwidth problem encountered by current optical networks. A single DWDM optical fiber has the capability of carrying as much as ten (10) terabits of data per second. Different approaches advocating the use of optical technology in place of electronics in switching systems has been proposed, however the limitations of optical component technology has largely limited optical switching to facility management applications. One approach called optical burst-switched networking attempts to make the best use of optical and electronic switching technologies. The electronics provides dynamic control of system resources, assigning individual user data bursts to channels of a DWDM fiber. Optical technology is used to switch the user data channels entirely in the optical domain.

One problem with switching user data channels entirely in the optical domain is that it is difficult to setup a data channel path across an optical burst-switched network without wasting network resources such as transmission and switching capacity. Each data channel within an optical path can range from ten (10) Gbps to forty (40) Gbps and the roundtrip delay of an optical path is very long when using conventional signaling approaches. Thus, setting up an optical path with bandwidth of one or more data channels in an optical burst-switched network takes a long time and wastes a huge amount of bandwidth. If the connection time is not sufficiently long, the bandwidth wasted may not be well justified.

Another problem with optical burst-switched networks relates to data channel scheduling. Schedulers within switch control units of core routers in the optical burst-switched network are responsible for scheduling burst payloads and their corresponding burst header packets on data channel groups (DCG) and control channel groups (CCG), respectively. A burst header packet has to be processed in the switch control unit as quickly as possible, thus the scheduling algorithm must be simple and fast.

One prior art scheduling algorithm is the Latest Available Unscheduled Channel (LAUC) algorithm, also known as the Horizon algorithm. In the LAUC algorithm, only one value, the future available/unscheduled time, is remembered for each data channel. However, the LAUC algorithm results in high burst loss ratio and thus low channel utilization due to the gaps/voids between bursts. Other more sophisticated scheduling algorithms usually lead to less burst loss ratio, but their implementation are very difficult since the scheduler has to work at a very high speed (e.g., about 100 nanoseconds per burst). Thus, a simple and fast scheduling algorithm is needed to reduce the burden of schedulers in optical burst-switched networks and to improve the performance of data channel scheduling.

SUMMARY OF THE INVENTION

The present invention provides an optical burst-switched network that substantially eliminates or reduces disadvantages and problems associated with previously developed optical burst-switched networks used for switching data channels.

More specifically, the present invention provides a system and method for reserving data channels in an optical burst-switched network. A data channel along an optical path in an optical burst-switched network is reserved by first transmitting a data channel reservation request from an electronic ingress edge router to a reservation termination node. Next, the data channel reservation request is processed at the reservation termination node. A data channel reservation acknowledgement is then transmitted from the reservation termination node to the electronic ingress edge router. Finally, the data channel path is reserved once an initial burst(s) which contains a reserve data channel bit reaches the reservation termination node.

The present invention provides an important technical advantage by providing a mechanism to use "cross connect" in the optical burst-switched network whenever possible without losing the efficiency and flexibility of burst switching.

The present invention provides another technical advantage by avoiding unnecessary hop-by-hop burst scheduling.

The present invention provides yet another technical advantage by reducing the load on schedulers of switch control units in optical core routers.

The present invention provides yet another technical advantage by reducing the gaps/voids between bursts transmitted on the reserved data channels, which in turn increases the data channel utilization.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
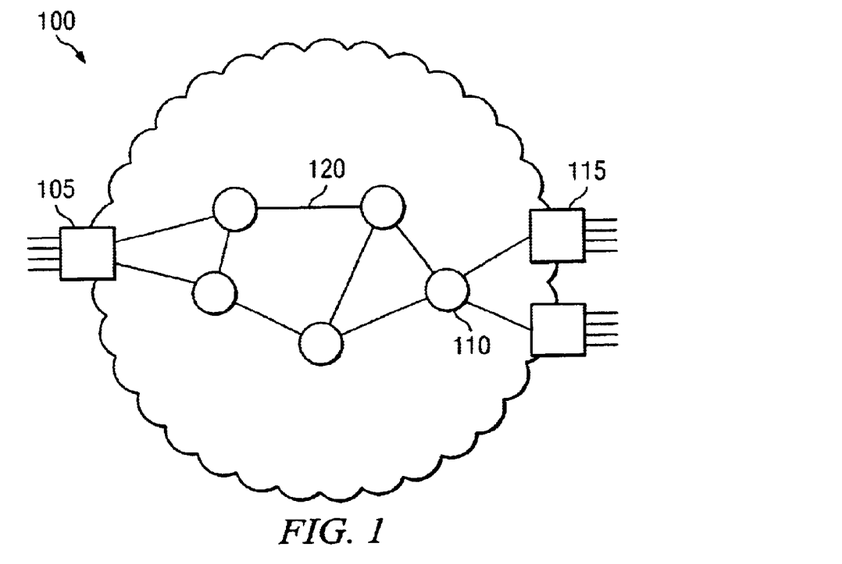
FIG. 1 shows an optical burst-switched network according to the present invention.

FIG. 1 shows one example of an optical burst-switched network 100. The optical burst switched network includes multiple electronic ingress edge routers 105, multiple optical core routers 110, multiple electronic egress edge routers 115, and multiple dense-wavelength division multiplexing (DWDM) optical links 120. The DWDM optical links 120 connect the electronic ingress edge routers 105, the optical core routers 110, and the electronic egress edge routers 115 together. The electronic ingress edge routers 105 and the electronic egress edge routers 115 perform burst assembly/disassembly functions and serve as legacy interfaces between the optical burst-switched network 100 and conventional electronic routers. Note that, although electronic ingress edge router and electronic egress edge router are logically distinguished in FIG. 1, both functions are often physically combined in a single physical edge router device.

A burst, the basic data block to be transferred through the optical burst-switched network, is a collection of data packets which have the same destination (network egress address) or destinations and other attributes such as quality of service (QoS) requirements. A burst consists of a burst header packet (BHP) and a burst payload. The format of the burst header packet may consists of an Internet protocol (IP) header (e.g., IPv4, IPv6) or a multi-protocol label switching (MPLS) shim header if MPLS is used or both, together with the optical burst switching specific information which will be used by switch control units to route bursts and by electronic egress edge routers 115 to receive bursts.

Figure 2:
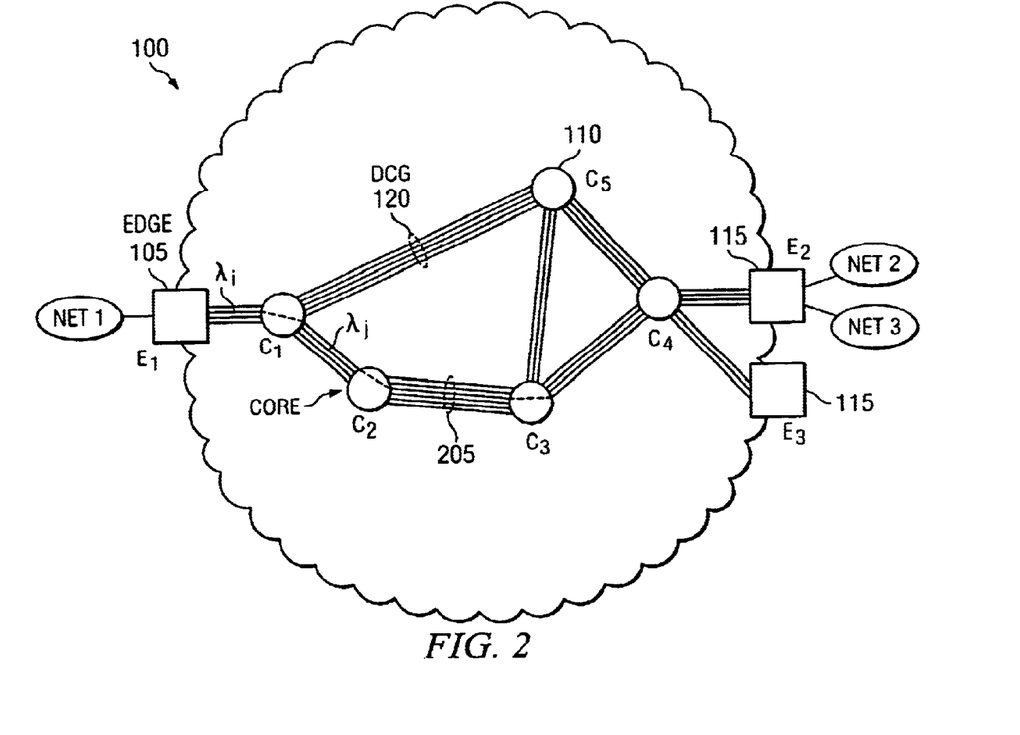
FIG. 2 shows a more detailed example of an optical burst-switched network according to the present invention.

FIG. 2 shows a more detailed example of the optical burst-switched network 100. Each DWDM optical link 120 can have many data channels 205. Each data channel 205 carries a single wavelength λ. Without loss of generality, in FIG. 2, assume here that all data channels 205 have the same transmission capacity which equals R bits per second (bps). Packets are assembled into bursts at electronic ingress edge routers 105 according to a burst assembly mechanism. The bursts are then forwarded at layer 3 or switched at layer 2 (if a MPLS type label switching mechanism is used) through the optical burst-switched network 100 to their electronic egress edge routers 115. A burst flow can be defined as a set of bursts which have the same electronic ingress edge router 105, follow the same path, and are destined to the same reservation termination node (RTN). The RTN can either be an electronic egress edge router 115 or an optical core router 110. A more strict definition of a burst flow requires that the bursts have the same or similar attributes like quality of service (QOS).

Figure 3:
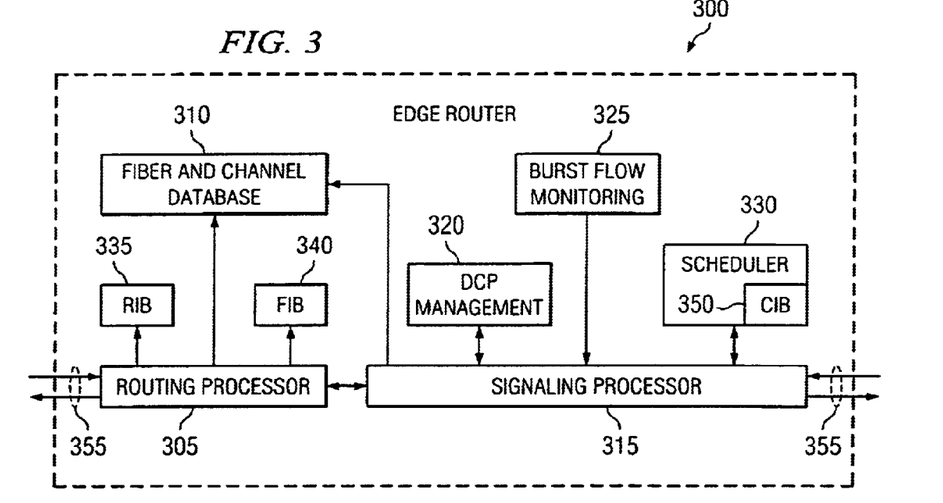
FIG. 3 shows a functional block diagram of an electronic edge router according to the present invention.

FIG. 3 shows a functional block diagram of an electronic edge router 300 according to the present invention. The electronic edge router 300 can consist of both an electronic ingress edge router 105 and an electronic egress edge router 115. The electronic edge router 300 includes a routing processor 305, a fiber and channel database 310, a signaling processor 315, a data channel path (DCP) management module 320, a burst flow monitoring module 325, a scheduler 330, a routing information base (RIB) 335, a forwarding information base (FIB) 340, and input and output ports 355. The scheduler 330 contains a channel information base (CIB) 350.

The routing processor 305 transmits to and receives network information from neighboring communication devices through the input and output ports 355. The neighboring communication devices can be another electronic edge router 300, optical core router 110, or other communication devices. The routing processor 305 runs the routing protocols (some are optical burst switching specific), exchanges information with neighboring communication devices, and updates the RIB 335 and FIB 340. The RIB 335 contains all the necessary routing information for the network. The RIB information constantly changes and is updated with current network routing information through the routing processor 305. The FIB 340 contains next hop (i.e. outbound DCG) information for arriving bursts. The next hop could either be an electronic egress edge router 115 or an optical core router 110. The FIB 340 is created and maintained by the routing processor 305 using the RIB 335.

Figure 4:
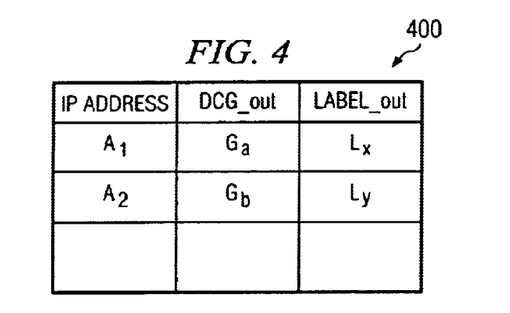
FIG. 4 shows one example of the forwarding information base at an electronic edge router according to the present invention.

When using a label-swapping technique like the MPLS, an additional column is added to the FIB 340 which is used to assign a label for each outgoing burst. An example of the FIB 340 is shown in FIG. 4. Note that only relevant information to the current invention is shown in FIG. 4, which is also the case for other figures. The fiber and channel database 310 receives and stores network information from the routing processor 305 and the signaling processor 315. This network information includes (1) the inbound and outbound fibers and the wavelengths within each fiber; (2) the inbound and outbound data channel groups, control channel groups, and channels within each group; (3) the mapping of data channel groups, control channel groups, and channels within each group to the physical fibers and wavelengths; and (4) the status of each inbound/outbound data channel 205. The data channels 205 can be in one of three possible states. The three states are the unreserved state, the reservation in progress state, and the reserved state. When a data channel 205 is in the unreserved state, the burst flow is being scheduled on the data channel 205 in the normal way. When a data channel 205 is in the reservation in progress state, the data channel 205 is reserved, but not committed. This means that the data channel 205 will still be used in the normal fashion (i.e., as an unreserved data channel). Thus, no data channel 205 bandwidth is wasted. A "0" is placed in the CIB 350 under the status field to represent the reservation in progress state. When a data channel 205 is in the reserved state, this means that the data channel 205 is committed and bursts cannot be scheduled on the reserved data channel 205 in the normal fashion.

The signaling processor 315 also transmits to and receives network information from neighboring communication devices through input and output ports 355. The burst flow monitoring module 325 monitors the burst flow to optical core routers 110 and electronic egress edge routers 115 and informs the signaling processor 315 when the average bit rate of a flow of bursts exceeds or drops below a given threshold. The threshold is defined here as a bit rate which is no less than a data channel bit rate. If the bit rate of a flow of bursts exceeds the given threshold, the data channel 205 can be reserved. If the bit rate of a flow of bursts drops below the given threshold, part of the reserved data channel 205 is not being used, thus reservation of the reserved data channel 205 will be terminated.

The DCP management module 320 transmits and receives information to and from the signaling processor 315. The purpose of the DCP management module 320 is to keep track of all the data channel 205 paths either already reserved or in the process of being reserved. The scheduler 330 also transmits and receives information to and from the signaling processor 315. The purpose of the scheduler 330 is to schedule the transmission of bursts and their associated burst header packets on data channel groups and control channel groups, respectively. There can be a scheduler 330 for a pair of data channel group and control channel group, or a set of data/control channel group pairs. Without loss of generality, FIG. 3 shows one scheduler 330 per data/control channel group pair.

The channel information base 350 in the scheduler 330 contains a subset of the fiber and channel database 310. This subset can include all inbound data channel groups, the outbound data channel groups and control channel groups, and the mapping to (physical) fibers and wavelengths. The outbound data channels 205 are divided into two subgroups. The two subgroups include (1) unreserved and reservation in progress data channels and (2) reserved data channels. Data channels 205 which are in the reservation in progress state operate exactly the same as data channels which are in the unreserved state. The use of reservation in progress outbound data channels is the same as unreserved outbound data channels. In addition, the channel information base 350 maintains a table for the reserved inbound and outbound data channels 205.

Figure 5:
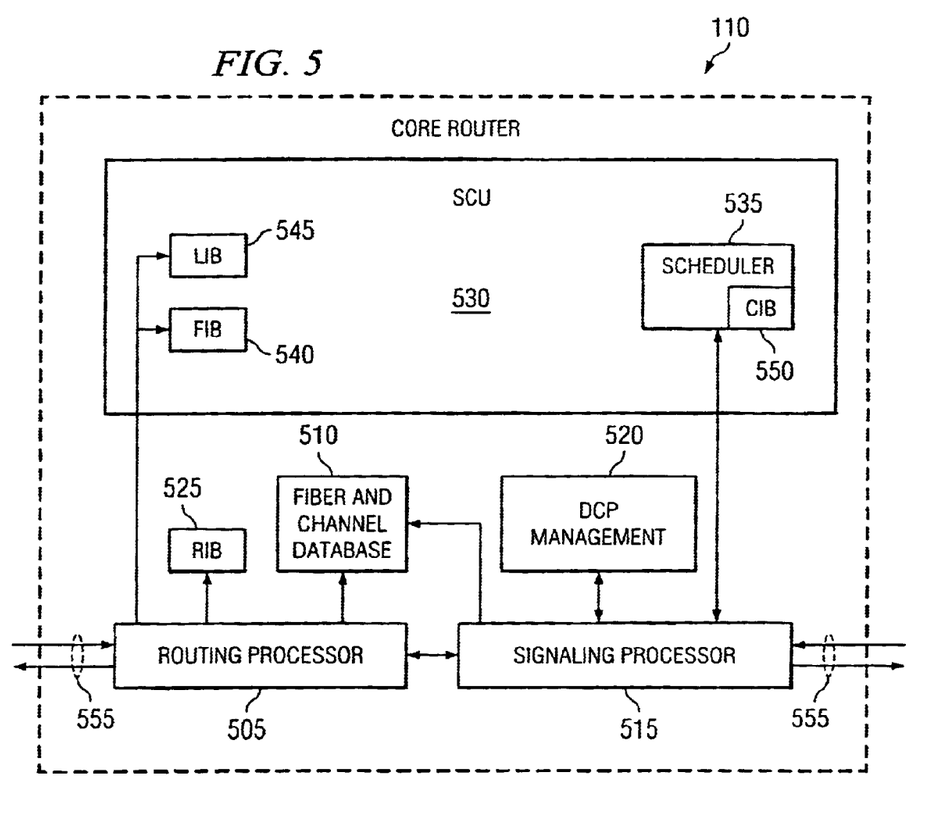
FIG. 5 shows a functional block diagram of an optical core router according to the present invention.

FIG. 5 shows a functional block diagram of an optical core router 110 according to the present invention. The optical core router 110 includes a routing processor 505, a fiber and channel database 510, a signaling processor 515, a data channel path (DCP) management module 520, a routing information base (RIB) 525, a switch control unit (SCU) 530 and input and output ports 555. The SCU includes a forwarding information base (FIB) 540, a label information base (LIB) 545, and a scheduler 535. The scheduler 530 contains a channel information base (CIB) 550.

Figure 6:
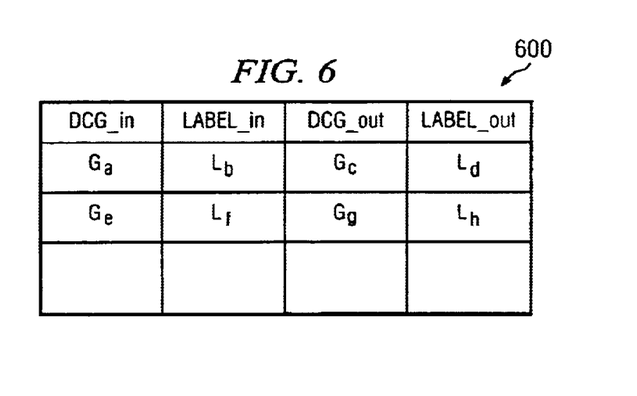
FIG. 6 shows one example of the label information base at an optical core router according to the present invention.

The routing processor 505 transmits to and receives network information from neighboring communication devices through the input and output ports 555. The neighboring communication devices can be another electronic edge router 300, optical core router 110, or other communication devices. The routing processor 505 runs the routing protocols (some are optical burst switching specific), exchanges information with neighboring communication devices, and updates the RIB 525, FIB 540, and LIB 545. The RIB 525 contains all the necessary routing information for the network. The routing information base constantly changes and is updated with current network routing information through the routing processor 505. The FIB 540 contains next hop (i.e. outbound DCG) information for arriving bursts. The next hop could either be an electronic egress edge router 115 or an optical core router 110. The FIB 540 is created and maintained by the routing processor 505 using the RIB 525. The LIB 545 is established when a label-swapping technique like the MPLS is used to switch bursts at layer 2. Shown in FIG. 6 is an example of the LIB 545.

The fiber and channel database 510 receives and stores network information from the routing processor 505 and the signaling processor 515. This network information includes (1) the inbound and outbound fibers and the wavelengths within each fiber; (2) the inbound and outbound data channel groups, control channel groups, and channels within each group; (3) the mapping of data channel groups, control channel groups, and channels within each group to the physical fibers and wavelengths; and (4) the status of each inbound/outbound data channel 205. Again, the data channels 205 can be in one of three possible states. The three states are the unreserved state, the reservation in progress state, and the reserved state. When a data channel 205 is in the unreserved state, the burst flow is being scheduled on a data channel 205 in the normal way. When a data channel 205 is in the reservation in progress state, the data channel 205 is reserved, but not committed. This means that the data channel 205 will still be used in the normal fashion (i.e., as an unreserved data channel) Thus, no data channel 205 bandwidth is wasted. A "0" is placed in the CIB 550 under the status field to represent the reservation in progress state. When a data channel 205 is in the reserved state, this means that the data channel 205 is committed and bursts cannot be scheduled on the reserved data channel 205 in the normal fashion.

The signaling processor 515 also transmits to and receives network information from neighboring communication devices through input and output ports 555. The DCP management module 520 transmits and receives information to and from the signaling processor 515. The purpose of the DCP management module 520 is to keep track of all the data channel paths either already reserved or in the process of being reserved. The scheduler 535 also transmits and receives information to and from the signaling processor 515. The purpose of the scheduler 535 is to schedule the transmission of bursts and their associated burst header packets on data channel groups and control channel groups, respectively. The scheduler 535 at the optical core router 110 schedules the switching of bursts from the inbound data channel groups to the outbound data channel groups and the transmission of the associated burst header packets on the outbound control channel groups. There can be a scheduler 535 for a pair of data channel group and control channel group, or a set of data/control channel group pairs. Without loss of generality, FIG. 5 shows one scheduler 535 per data/control channel group pair.

The channel information base 550 in the scheduler 535 contains a subset of the fiber and channel database 510. This subset can include all inbound data channel groups, the outbound data channel groups and control channel groups, and the mapping to (physical) fibers and wavelengths. The outbound data channels are divided into two subgroups. The two subgroups include (1) unreserved and reservation in progress data channels and (2) reserved data channels. Data channels 205 which are in the reservation in progress state operate exactly the same as data channels which are in the unreserved state. In addition, the channel information base 550 maintains a table for the reserved inbound and outbound data channels 205 (see FIG. 9).

Referring back to FIG. 2, a burst can only be transmitted at the bit rate of a data channel 205, although the total transmission capacity of a DWDM optical link 120 is much larger than that of a single data channel 205. If the average bit rate of a flow of bursts from an electronic ingress edge router 105 to an electronic egress edge router 115 is identified to be larger than a data channel rate, at least one data channel 205 could be reserved on the path between the electronic ingress edge router 105 to the electronic egress edge router 115, either via default route or explicit route. By doing so, gaps/voids could be largely eliminated on the reserved data channels 205 along the path right from the electronic ingress edge router 105. Furthermore, the load of the corresponding schedulers is reduced as no scheduling needs to be done for a reserved data channel 205, except updating the data channel 205 unscheduled (or future available) time. Traffic flow that cannot be accommodated by the reserved data channel 205 path can be forwarded hop-by-hop to the electronic egress edge router 115 as before. This methodology is not limited to an electronic ingress edge router 105 and electrocnic egress edge router 115 pair. It can also be extended to any pair of electronic ingress edge router 105 and optical core routers 110 in the optical burst-switched network 100.

In FIG. 2, assume that the average bit rate X of a burst flow from electronic ingress edge router $E_1$ to a RTN, say optical core router $C_4$, is detected by the burst flow monitoring module 325 to be $R+\Delta$ bps where $\Delta \geq 0$. The burst flow monitoring module 325 will first notify the signaling processor 315. The electronic ingress edge router El may then decide to reserve a data channel 205 along a path for the flow so that a large portion of the traffic $(=R/(R+\Delta))$ will be transported via the reserved data channel 205. It is expected that gaps/voids on the reserved data channel 205 can be substantially reduced or even largely eliminated if $\Delta$ is sufficiently large or the fluctuation of the burst flow is small. To reserve a data channel 205 path, the signaling processor 315 first consults with the routing processor 305 for a route from the electronic ingress edge router $E_1$ to the optical core router $C_4$. Suppose the route given by the routing processor 305 is $E_1$–$C_1$–$C_2$–$C_3$–$C_4$, which could be an existing route used by the flow or a new route.

Figure 7:
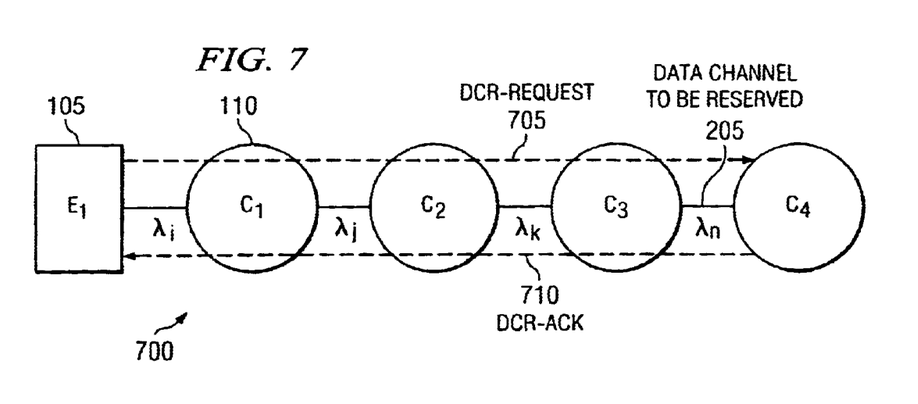
FIG. 7 shows an example depicting the data channel path set up according to the present invention.

To reserve a data channel 205 along the path, the signaling processor 315 at electronic ingress edge router $E_1$ first finds an unreserved outbound data channel 205 connecting to the optical core router $C_1$, say $\lambda_i$, from the fiber and channel database 310. It then sends out a Data-Channel-Reservation-Request (DCR-Request) message 705 to optical core router $C_1$, indicating that outbound data channel A, will be reserved for the flow as shown in FIG. 7. The status of $\lambda_i$ is changed by the signaling processor 315 from unreserved to reservation in progress in the fiber and channel database 310 as well as in the CIB 350. The DCR-Request message 705 contains the path information and the outbound data channel identifier among others, e.g., ($E_1$, $C_1$, $C_2$, $C_3$, $C_4$, $\lambda_i$), in this case. The information carried by the DCR-Request message 705 will be stored in the DCP management module 320.

The signaling processor 515 at optical router $C_1$ determines that the next hop is optical core router $C_2$ from the received DCR-Request message 705 sent by electronic edge router $E_1$. It assigns an unreserved outbound data channel 205, say $\lambda_j$, to the burst flow and then sends the modified DCR-Request message 705 (now with $\lambda_j$) to the next optical core router $C_2$. The status of $\lambda_i$ and $\lambda_j$ are changed by the signaling processor 515 from the unreserved state to the reservation in progress state in the fiber and channel database 510 and the status of $\lambda_j$ is also changed in the corresponding CIB 550 of optical core router $C_1$. The information carried by the DCR-Request message 705 will be stored in the DCP management module 520. It is assumed here that the error-free transmission of messages between two adjacent signaling processors is guaranteed by the lower layer protocols.

Figure 8:
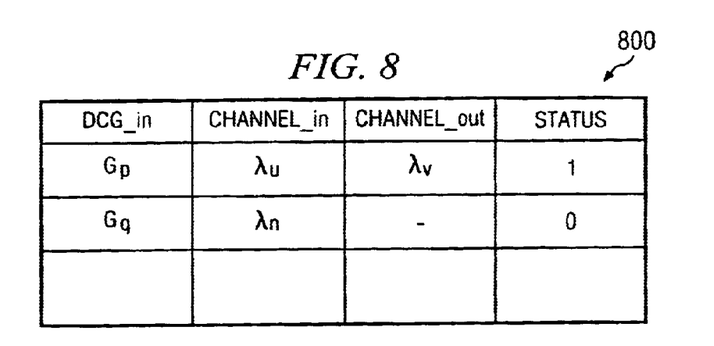
FIG. 8 shows an example of the channel information base at optical core router C4.
Figure 9:
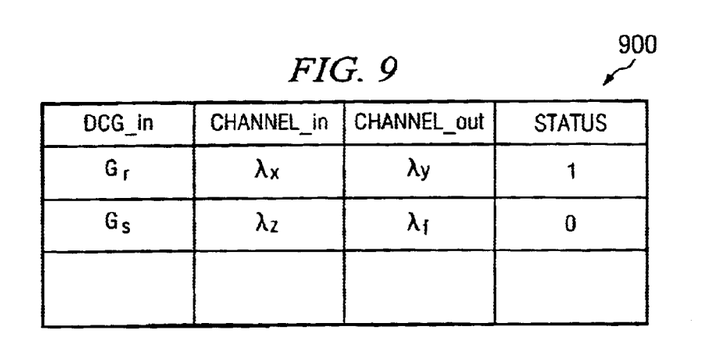
FIG. 9 shows an example of the channel information base at optical core router C1.

The same procedure is repeated at optical core routers $C_2$, $C_3$ and $C_4$. Suppose outbound data channel $\lambda_n$ of optical core router $C_3$ is chosen for the path (see FIG. 7). At optical core router $C_4$, the CIB 550 simply records that inbound channel $\lambda_n$ is in the status of reservation in progress (set by optical core router $C_3$) as shown in FIG. 8, where status "1" means the channels are reserved, "0" means the channels are in the reservation process, and symbol "-" means this optical core router $C_4$ is a RTN. Optical core router $C_4$ will send back a DCR-acknowledgement (DCR-ACK) message 710 to optical core router $C_3$, which in turn goes through optical core routers $C_2$, $C_1$, and finally reaches electronic ingress edge router $E_1$. Upon receiving the DCR-ACK message 710, a router (core 110 or edge 105) in the path will create a new entry in the CIB of the scheduler, specifying that the inbound and outbound data channels 205 are in the reservation process. An example of CIB 550 at optical core router $C_1$ is shown in FIG. 9. FIG. 9 shows a channel information base 550 table. The CIB 550 table shows the name of the DCG_in, $G_r$. Furthermore, the CIB 550 shows that channel_in has a wavelength of $\lambda_x$, channel_out has a wavelength of $\lambda_y$, and the status of the data channel 205 is "1", which means the data channel 205 is reserved. The CIB 550 table in FIG. 9 also shows another DCG—in, $G_s$. The CIB 550 also shows that channel_in has a wavelength of $\lambda_i$, channel—out has a wavelength of $\lambda_j$, and the status of the data channel 205 is "0", which means the data channel reservation is in progress. The initial data channel reservation process is now completed.

If no unreserved outbound data channel 205 is found or a router (core 110 or edge 115) in the path decides not to continue the path setup process, it will send back a negative DCR-acknowledgement (DCR-NAK) message 710 all the way to the electronic ingress edge router $E_1$. Thus, the attempt by the electronic ingress edge router $E_1$ to establish a reserved data channel 205 path failed. To insure the error-free transmission and receiving of signaling messages, the signaling processor (both 315 and 515) may be required to send back an acknowledgement (ACK) message to its upstream node when it receives a DCR-Request, DCR-ACK or DCR-NAK. Some time-out mechanism may be used to cope with possible loss of signaling messages.

Figure 10:
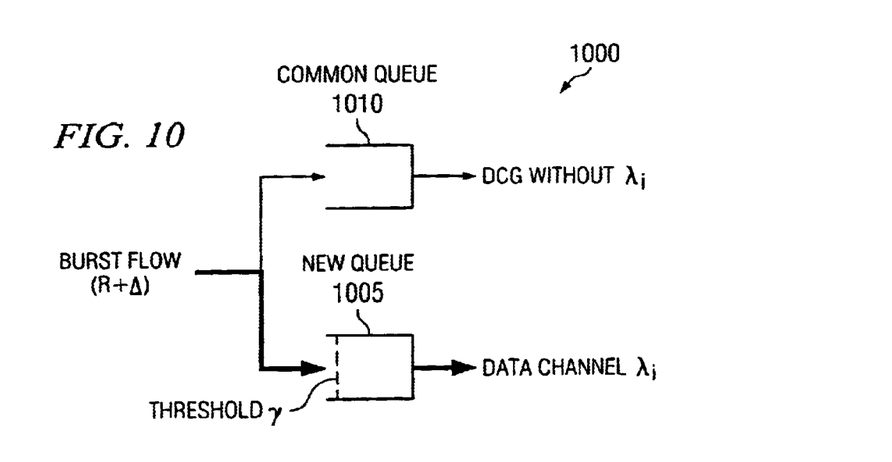
FIG. 10 shows an example depicting the threshold of a new queue for a reserved data channel.

Electronic ingress edge router $E_1$ creates a new queue 1005 after receiving the DCR-ACK 710 from optical core router $C_1$ as shown in FIG. 10. This new queue 1005 is used to accommodate the flow bursts to be sent on the reserved data channel $\lambda_i$. To reduce or largely eliminate the gaps/voids between bursts sent on the reserved data channel 205, a threshold $\gamma$ is maintained for the new queue 1005, the value of which could be the traffic volume in bytes or the number of bursts in the new queue 1005. Once the threshold $\gamma$ is exceeded, the burst flow will be directed to the common queue 1010 until the quantity in the new queue 1005 is dropped below the threshold. A special bit in the burst header packet, called reserved data channel (RC) bit, is used to indicate whether a burst is transmitted on the reserved data channel 205. For bursts sent on the reserved data channel 205, their RC bit is set to 1.

The actual reservation of the data channels 205 along the optical path is made by the first bursts of the burst flow sent from electronic ingress edge router $E_1$ on outbound data channel $\lambda_i$. For instance, upon receiving the first BHP with RC=1from data channel $\lambda_i$, the scheduler 535 of optical core router $C_1$ will do the following: (1) reserve the outbound data channel $\lambda_j$ and configure the optical switching matrix to connect inbound data channel $\lambda_i$, to outbound data channel $\lambda_j$ when the first burst is switched; (2) update the status bit in the CIB 550 (see FIG. 9) from 0 to 1, indicating data channel $\lambda_i$ and data channel $\lambda_j$ are now reserved, (3) move data channel $\lambda_j$ from the unreserved and reservation in progress channel subset to the reserved channel subset in the CIB 550, and (4) change the status of data channel $\lambda_i$, and data channel $\lambda_j$ from reservation in progress to reserved in the fiber and channel database 510. At this point, all incoming bursts on data channel $\lambda_i$ with RC=1will be switched to outbound data channel $\lambda_j$, and no data channel 205 scheduling is need for data channel $\lambda_j$. To prevent the potential loss of the first burst of the flow at an optical core router 110 in the reserved data channel 205 path due to traffic congestion, this burst (with RC=1) may have higher priority in the scheduler 535.

The same procedure is repeated at optical core routers $C_2$, $C_3$, and $C_4$. So when the first burst with RC=1reaches optical core router $C_4$, a reserved data channel path is established (see FIG. 2), and routers $C_1$, $C_2$ and $C_3$ need not perform any scheduling for the reserved data channels. At optical core router $C_4$, bursts received on the reserved data channel path will have their RC bits reset to 0 by the scheduler 535 (optical core router $C_4$ is a RTN). Note that no bandwidth is wasted during the entire data channel reservation process as bursts are still forwarded or switched as before during this period. Note also that BHPs are always forwarded or switched at the switch control unit (SCU) 530 although data channels $\lambda_i$, and $\lambda_j$ are cross-connected. A CIB 550 table lookup is required for bursts received from reserved data channels.

If an electronic ingress edge router 105 decides to terminate the reserved data channel path, either because the average rate of the burst flow is below R+Δ or for other reasons, it simply sends a burst with an unreserved channel bit RC=0 on outbound data channel $\lambda_i$. After receiving one or more bursts with RC=0 on the reserved inbound data channel, an optical core router 110 will terminate the reservation, update the CIB 550 and the fiber and channel database 510 (e.g., removing the entry of data channels $\lambda_i$, and $\lambda_j$ in the CIB 550 and moving them to the unreserved channel subset, if the optical core router is $C_1$), and resume the normal forwarding and/or switching for new arriving bursts. The optical core router 110 will also send a confirmation message back to electronic edge router $E_1$. Again, no bandwidth is wasted during the reservation termination process.

To prevent malfunctions in the electronic ingress edge routers 105 or optical core routers 110, a timer (not shown) is maintained in each router (105, 110 or 115) along the path, which should be reset by a refresh message sent by the electronic ingress edge router 105 before it expires. If the timer expires, the corresponding router will terminate the channel reservation and inform others routers.

In general, if the average bit rate of the flow is m·R+Δ(m) where m is a nonnegative integer, up to m data channel 205 paths could be reserved. These data channel 205 paths may follow the same route or different routes, but have the same RTN. The number of channels in a data channel 205 path could be more than one. The threshold γ(m) now is a function of m. The above data channel reservation method is also valid if an electronic ingress edge router 105 has more than one RTN.

The data channel reservation method of the present invention is flow-driven, initiated by ingress edge router on demand, protocol independent, and adaptive to the average bit rate of a flow of bursts. The data channel reservation method of the present invention is also suitable for both loose and strict definitions of burst flows. A burst flow is loosely defined as a set of bursts which have the same electronic ingress edge router 105, follow the same path, and are destined to the same reservation termination node (RTN). The strict definition of a burst flow requires that the bursts have the same or similar attributes like quality of service (QOS). The data channel reservation method can also be combined with a layer 2 protocol like MPLS to establish a label switched path (LSP) with bandwidth reservation. Note that the above data channel reservation approach is also suitable for establishing a path with certain reserved bandwidth (of data channels 205) in the optical burst-switched network 100 even if the flow driven factor is not considered.

In summary, the present invention provides a system and method for reserving data channels in an optical burst-switched network. A data channel (or a multiple of data channels) along an optical path in an optical burst-switched network is reserved by first transmitting a data channel reservation request from an electronic ingress edge router to a reservation termination node. Next, the data channel reservation request is processed at all nodes along the path. A data channel reservation acknowledgement is then transmitted from the reservation termination node to the electronic ingress edge router. Finally, the data channel path is reserved once an initial burst(s) which contains a reserve data channel bit reaches the reservation termination node.

Although the present invention has been described in detail, it should be understood that various changes, substitutions and alterations can be made hereto without departing from the spirit and scope of the invention as described by the appended claims.

What is claimed is:

1. A method of reservation of data channels along an optical path in an optical burst switched network, comprising the steps of:
   monitoring a data rate of burst flows at an edge router in the optical burst switched network to determine if the data rate of a burst flow exceeds a first threshold;
   in response to the data rate of a burst flow exceeding the first threshold, reserving a new data channel for the burst flow; and
   transmitting the burst flow over the reserved data channel.

2. The method of claim 1, further comprising the steps of:
   creating a reserved data channel queue to accommodate the burst flow to be transmitted on the reserved data channel.

3. The method of claim 2, further comprising the steps of:
   monitoring a volume of the reserved data channel queue;
   in response to the volume of the reserved data channel queue exceeding a volume threshold, directing bursts from the burst flow to a common queue; and
   transmitting the bursts from the burst flow in the common queue over an unreserved data channel.

4. The method of claim 3, further comprising the steps of:
   in response to the volume in the reserved data channel queue dropping below the volume threshold again, directing the bursts from the burst flow to the reserved data channel queue.

5. The method of claim 4, further comprising the steps of:
   indicating that a particular burst belonging to a burst flow is being transmitted on the reserved data channel by marking a control field in a burst header packet of the burst.

6. The method of claim 5, wherein the step of indicating that a particular burst belonging to a burst flow is being transmitted on the reserved data channel comprises marking a reserved data channel bit in the burst header packet.

7. The method of claim 1, further comprising the steps of:
   monitoring the data rate of the burst flow at the edge router in the optical burst switched network to determine if the data rate of the burst flow drops below a second threshold; and
   in response to the data rate of the burst flow dropping below the second threshold, terminating reservation of the data channel for the burst flow.

8. The method of claim 7, wherein the first threshold and the second threshold are greater than or equal to a data channel bit rate.

9. The method of claim 8 where in the step of reserving a new data channel for the burst flow comprises:

transmitting a data channel reservation request from an electronic ingress edge router to a reservation termination node;

processing said data channel reservation request at said reservation termination node;

transmitting a data channel reservation acknowledgement from said reservation termination node to said electronic ingress edge router; and reserving said data channel once an initial burst comprising a reserve data channel bit reaches said reservation termination node.

10. The method of claim 1, wherein the first threshold equals $R+\Delta$, wherein R equals the data rate of a data channel and $\Delta \geq 0$.

11. The method of claim 10, further comprising the steps of:

determining that the data rate of the burst flow exceeds m times the first threshold, wherein m is a nonnegative integer; and reserving m new data channels for the burst flow.

12. The method of claim 11, wherein one or more of the m new data channels for the burst flow follow different routes through the optical burst switched network.

13. An ingress edge router in an optical burst switched network, comprising:

a burst flow monitoring module operable to monitor data rates of burst flows between the ingress edge router and termination nodes in the optical burst switched network and to determine when a data rate for a burst flow rate exceeds a first threshold;

a signaling processor for initiating reservation of a new data channel for a burst flow in response to the burst flow monitoring module determining that the data rate for the burst flow has exceeded the first threshold; and a first scheduler operable to schedule the transmisison of bursts from a burst flow on a data channel reserved for the burst flow.

14. The ingress edge router of claim 12, further comprising:

a data channel path management module operable to monitor all data channel paths which are already reserved or in the process of being reserved.

15. The ingress edge router of claim 14, further comprising:

one or more reserved data channel queues to accommodate bursts to be transmitted on reserved data channels; and one or more common queues to accommodate bursts to be transmitted on unreserved data channels.

16. The ingress edge router of claim 15, further comprising:

a first routing processor operable to transmit and receive optical burst switched network information from neighboring communication devices through the input ports and output ports.

* * * * *